United States Patent [19]
Ravon

[11] Patent Number: 6,121,762
[45] Date of Patent: Sep. 19, 2000

[54] NON-ISOLATED LOW VOLTAGE SWITCH-MODE POWER SUPPLY

[75] Inventor: Jean-Michel Ravon, Fuveau, France

[73] Assignee: STMicroelectronics S.A., Gentilly, France

[21] Appl. No.: 09/344,846

[22] Filed: Jun. 28, 1999

[30] Foreign Application Priority Data

Jun. 29, 1998 [FR] France .................................. 98 08430
Oct. 16, 1998 [FR] France .................................. 98 13169

[51] Int. Cl.$^7$ ...................................... G05F 1/44
[52] U.S. Cl. .......................................... 323/287; 323/283
[58] Field of Search .................... 323/283, 284, 323/265, 287, 286

[56] References Cited

U.S. PATENT DOCUMENTS

| | | | |
|---|---|---|---|
| 4,998,044 | 3/1991 | Nilssen | 315/200 |
| 5,798,619 | 8/1998 | Covington | 315/307 |
| 5,818,214 | 10/1998 | Pelly et al. | 323/351 |
| 5,905,370 | 5/1999 | Bryson | 323/283 |

FOREIGN PATENT DOCUMENTS

| | | | |
|---|---|---|---|
| 0 351 920 | 1/1990 | European Pat. Off. | H05B 39/00 |
| 2 743 954 | 7/1997 | France . | |
| 196 12 365 | 10/1997 | Germany . | |
| 196 24 460 | 1/1998 | Germany . | |
| WO 98/33265 | 7/1998 | WIPO . | |

*Primary Examiner*—Shawn Riley
*Attorney, Agent, or Firm*—Wolf, Greenfield & Sacks, P.C.; James H. Morris; Theodore E. Galanthay

[57] ABSTRACT

A non-isolated voltage converter, of switch-mode type, includes a capacitor between terminals that provide an output voltage regulated by a circuit that controls a switch that provides current to an inductive element. A local supply for the control circuit receives energy from the inductive element. In one embodiment, the inductive element has a tab between two windings, and the output voltage of the converter is smaller than the local supply voltage of the control circuit. In another embodiment, a diode is interposed between a positive terminal of the output capacitor and a positive terminal of a capacitor of the local supply of the control circuit. The negative terminal of the local supply capacitor is connected to the mid-point of a series association of the switch with the inductive element. A zener diode is interposed, in series with the local supply capacitor and the local supply diode, between the mid-point and the positive output terminal.

13 Claims, 6 Drawing Sheets

NON-ISOLATED LOW VOLTAGE SWITCH-MODE POWER SUPPLY

BACKGROUND OF THE INVENTION

1. Field of the Invention

The present invention relates to the field of power converters of low-voltage switch-mode power supply type. The present invention applies, more specifically, to non-isolated power supplies, that is, power supplies having a common node with the A.C. supply network, for example, the mains at 220 or 110 volts. It should however be noted that the present invention applies, more generally, to any switch-mode power supply system adapted to providing a D.C. voltage to a load.

2. Discussion of the Related Art

A switch-mode power supply circuit to which the present invention relates always includes an inductive element in series with a switch, to charge a capacitor across which the output voltage is sampled, a switch control circuit to regulate the output voltage by modifying the switch conduction periods and a free wheel diode of the inductive element. A switch-mode power supply circuit receives a D.C. voltage, generally, a rectified A.C. voltage.

FIG. 1 shows a conventional example of a switch-mode power supply of the type to which the present invention applies. In the example of FIG. 1, two input terminals P, N, receive an A.C. voltage Vac, for example, the mains voltage. Voltage Vac undergoes a rectifying, for example, a single-halfwave rectifying by means of a diode Dr, the anode of which is connected to terminal P and the cathode K of which provides a rectified voltage Vr. Voltage Vr is generally smoothed by means of a capacitor C1 connected between terminals K and N. Terminals K and N form the input terminals of the actual switch-mode power supply.

The circuit of FIG. 1 shows an assembly known as a "non-isolated voltage step-down converter", which is characterized by the fact that switch 1 (for example, an N-channel MOS transistor) is seriesconnected with an inductance Li and a capacitor Ci between terminals K and N of application of the rectified voltage. This converter operates in switched mode at a non-audible high frequency (generally over 20 kHz). Switch 1 is controlled by a circuit 2 which determines its on and off periods. A free wheel diode Di is connected in parallel with the series association of inductance Li and capacitor Ci, the cathode of diode Di being connected to the midpoint 3 of the series association of switch 1 with inductance Li.

The terminals of capacitor Ci form two output terminals Sp, Sn of the converter, intended for supplying a load (not shown) with a voltage Vout. Control circuit 2 of switch 1 is formed of a circuit of generation of a control gate signal for transistor 1 by pulse-width modulation. Circuit 2 is associated with a local supply assembly formed, in this example, of a power storage capacitor C1, across which circuit 2 is supplied. A first positive terminal PL of capacitor C1 is connected, via a resistor Rp, to terminal K providing rectified voltage Vr. The negative terminal NL of capacitor C1 is connected to midpoint 3 of the series association of transistor 1 with inductance Li, and forms the reference supply potential of circuit 2. A zener diode may be mounted in parallel with capacitor C1 to limit the value of the local supply voltage between two respectively positive and reference lines PL and NL, corresponding to the terminals of capacitor C1.

Generation and pulse-width modulation circuit 2 is, for example, an integrated circuit sold by STMicroelectronics under trade name UCC3824. This circuit includes two supply terminals Vdd, Vss, respectively connected to lines PL and NL, an output terminal s connected, possibly via a switching rate control resistor R1, to the gate of transistor 1, and three parametering input terminals OSC, Vfb, and COMP. Terminal OSC is intended for adjusting the frequency of an oscillator contained by circuit 2 to generate the control pulses. This frequency is conditioned by the respective values of a resistor R2 and of a capacitor C2 associated in series between lines PL and NL, the midpoint 4 of their series association being connected to terminal OSC. Terminal Vfb is intended for receiving a regulation order to have the width of the control pulses controlled by output voltage Vout, to maintain said voltage to the desired value. Terminal COMP is connected, via a resistor R3 in series with a capacitor C3, to line NL. Terminal COMP forms a compensation input terminal to stabilize the regulation loop.

The signal received by terminal Vfb of circuit 2 generally originates from an error circuit 5, or a circuit for measuring the drift of voltage Vout with respect to the desired value. Circuit 5 is generally formed of a comparator 6 (for example, an operational amplifier), a first (non-inverting) input terminal of which receives a reference voltage Vref, determined by a zener diode DZ, and a second (inverting) input terminal of which is connected to midpoint 7 of a series association of two resistors R4, R5, connected across capacitor Ci.

In the example shown in FIG. 1, the output of switch 6 is connected to the cathode of the photodiode 8 of an optocoupler 9. The anode of photodiode 8 is connected, via a resistor R6, to positive terminal Sp providing output voltage Vout. Operational amplifier 6 is generally associated with a feedback loop, for example, formed of a capacitor C7 in series with a resistor R7 between its output and its inverting input. Phototransistor 10 of optocoupler 9 is connected, by its collector, to positive local supply line PL of circuit 2 and, by its emitter, to terminal Vfb of circuit 2. A resistor R8 connects terminal Vfb to line NL, and forms a current-to-voltage converter at the input Vfb of circuit 2.

To reverse the control, a bipolar transistor (not shown) may be connected between the cathode of photodiode 8 and reference line Sn, the base of the transistor being connected to the output of comparator 6.

When the voltage sampled at node 7 exceeds the voltage threshold determined by zener diode DZ, photodiode 8 is crossed by a current and the potential of terminal Vfb is thus switched to a high level by the turning-on of phototransistor 10. Conversely, when phototransistor 10 is off, the potential of signal Vfb is low.

The respective sizings of resistive bridge R4, R5, and of diode DZ enable determining the regulation value of voltage Vout issued by capacitor Ci. For example, an operational amplifier 6, associated with a voltage reference Vref of 2.5 volts, is available in the form of an integrated circuit error amplifier, sold by STMicroelectronics under trade name TL431.

It should be noted that, according to the value of inductance Li, the current flowing therethrough is direct or not. It should also be noted that, for a non-isolated power supply, capacitors Ci and C1 have a common terminal. Further, if circuits of switching on the high rectified voltage present across capacitor C1 are desired to be made downstream, this common terminal is the negative terminal (cold point).

A first disadvantage of conventional switch-mode power supply-type conventional converters is the compulsory use of an isolating element formed, either of an optocoupler as illustrated in FIG. 1, or of a transformer. Indeed, integrated circuit 2 of control of switch 1 is referenced on source 3 of transistor 1 whereas the measurement performed by circuit 5 is referenced on negative terminal Sn of capacitor Ci. These different references make a direct connection between measurement circuit 5 and control circuit 2 impossible.

Another disadvantage is that the supply of control circuit 2 requires a resistor (Rp), which causes a high dissipation in the circuit. Indeed, this resistor must enable the supply of the pulse-width modulation circuit which requires, generally, a current of several tens of milliamperes, and must absorb the power due to the large potential difference present between terminals K and PL, in the middle of the halfwaves of voltage Vr if said voltage comes from the mains.

Another disadvantage of a conventional circuit such as shown in FIG. 1 is that the control block generally includes, when made in the form of an integrated circuit, its own error amplifier. Accordingly, circuit 5 is redundant but is necessary due to the presence of the isolating block (optocoupler 9).

FIG. 2 partially shows a second conventional example of a switch-mode power supply circuit. The example of FIG. 2 is known as a non-isolated voltage step-down/step-up converter and characterizes by the fact that capacitor Ci is no longer in series with inductance Li and the switch between the two terminals of application of rectified voltage Vr, the inductance still being in parallel with a series association of the free wheel diode Di with capacitor Ci. This arrangement enables operating the converter in voltage step-up mode with respect to the input voltage.

For clarity, FIG. 2 only shows those elements of the converter which differ from the assembly of FIG. 1. Thus, control circuit 2 and switch 1 as well as their associated parametering components have not been shown. It should however be noted that, in the assembly of FIG. 2, positive output terminal Sp corresponds to phase P of the A.C. power supply, the rectifying diode (Dr, FIG. 1) having its anode connected to the neutral of the A.C. power supply.

Measurement circuit 5' of a step-down/step-up converter such as shown in FIG. 2 is, for example, formed of an assembly based on a comparator 6 as in FIG. 1. However, the output of comparator 6 now is connected, via resistor R6, to the anode of photodiode 8 of optocoupler 9, the cathode of which is connected to reference terminal Sn of output voltage Vout. Zener diode DZ is connected between the non-inverting terminal of amplifier 6 and positive output terminal Sp, its anode being connected to the non-inverting input. In the example of FIG. 2, the feedback loop of amplifier 6 has been simplified to only include a capacitor C7. The emitter of phototransistor 10 is connected to terminal Vfb of circuit 2 (FIG. 1) and its collector is connected to line PL.

A step-down/step-up converter such as illustrated in FIG. 2 suffers from the same disadvantages as those described in relation with the converter of FIG. 1.

In some applications, N-channel MOS transistor 1 can be integrated with its electronic control circuit on a same chip. An example of such an integrated circuit is a circuit sold by STMicroelectronics, known under trade name VIPER.

FIG. 3 shows an example of a conventional diagram implementing component 11. The representation of FIG. 3 is partial in that it only shows the control portion of switch 1', integrated to circuit 11. The rest of the assembly is similar, either to the assembly of FIG. 1, or to the assembly of FIG. 2 according to the type of converter made.

In FIG. 3, VIPER component 11 has been symbolized by its integrated switch 1', controlled in pulse-width modulation by an amplifier 12 receiving, as an input, an oscillation order provided by a block 13 (PWM) and an error signal provided by an integrated error amplifier 14. VIPER circuit 11 includes an input terminal Vdd for receiving a positive power supply, a voltage reference terminal Vss, a terminal OSC determining the oscillation frequency of block 13, and a compensation terminal VVcomp of the feedback loop. Amplifier 14 is associated with an integrated voltage reference (symbolized by a zener diode DZ'), and its comparison input is internally connected to positive supply terminal Vdd. Circuit 11 also includes, of course, accesses to the two power terminals of switch 1', one of these terminals (the drain of the MOS transistor forming switch 1') corresponding to voltage reference terminal Vss.

A VIPER circuit such as illustrated in FIG. 3 characterizes by the fact that it is current-controlled and that the control, that is, the control pulse-width modulation of switch 1', is performed by varying a compensation loop of integrated circuit 11 which tends by itself to maintain its supply voltage (Vdd–Vss).

Thus, in an application to a switch-mode converter, terminal Vdd is connected, via a resistor Rp, to terminal K of application of the rectified voltage. Terminal OSC is connected to the midpoint 4 of a series association of a resistor R2 with a capacitor C2 determining, as in the case of FIG. 1, the oscillation frequency. A resistor R3, in series with a capacitor C3, is connected between terminal Vcomp and midpoint 3 of the series association of switch 1' with inductance Li (not shown). A capacitor C1 is connected between terminal Vdd forming a positive local supply line PL of circuit 11 and terminal 3 forming a negative supply line NL of this circuit, connected to terminal Vss. The use of a circuit 11 requires a zener diode DZ1 to make the local supply voltage accurate. Indeed, such an integrated circuit is provided for regulating its own supply voltage to a given value (for example, 13 volts) while being supplied under a value which can be different (for example, between 8 and 16 volts).

To vary the width of the turn-on pulses of switch 1', the potential applied to terminal Vcomp is modified, that is, the compensation loop is disturbed so that error amplifier 14 introduces a correction. This is done, for example, via a transistor 10, the collector of which is connected to terminal Vcomp and the emitter of which is connected to line NL. When transistor 10 is turned on, it modifies the supply of circuit 11 and, accordingly, the width of the turn-on pulses of switch 1'.

As previously, for an assembly such as illustrated in FIG. 3 to be able to operate in a non-isolated converter, transistor 10 must be a phototransistor of an optocoupler 9, the photodiode of which (not shown) is controlled similarly to one of the two assemblies illustrated by FIGS. 1 and 2.

Thus, even with an integrated circuit of the type shown in FIG. 3, a converter, be it a step-down/step-up converter or a step-down converter, suffers from the same disadvantages as previously. Additionally, when operating in the step-down mode, the converter cannot provide a voltage lower than the supply voltage of the integrated circuit.

SUMMARY OF THE INVENTION

The present invention aims at providing a novel switch-mode voltage converter, of low consumption. The present invention aims, more specifically, at minimizing the dissipation of the control circuit of the converter switch.

The present invention also aims at increasing the output voltage range of a converter wherein the main switch is integrated with its control circuit.

Another object of the present invention is to provide a novel switch-mode converter which avoids using an isolating block between the measurement circuit and the control circuit of the switch.

To achieve these objects, the present invention provides a non-isolated voltage converter, of switch-mode power supply type, including a capacitor between the terminals of which is sampled an output voltage regulated by means of a circuit of control of a switch for providing current to an inductive element, the converter comprising a means for locally supplying the control circuit from energy of the inductive element, the inductive element having a tap between two windings, and the output voltage being smaller than the local supply voltage of the control circuit of the switch.

According to an embodiment of the present invention, said means is formed of a diode interposed between an extreme terminal of the inductive element and a positive terminal of a capacitor of local supply of the control circuit, the negative terminal of the local supply capacitor being connected to the midpoint of the series association of the switch with the inductive element.

According to another embodiment of the present invention, the control circuit is a circuit integrating the switch.

According to another embodiment of the present invention, said means locally supplies the control circuit from the output voltage.

According to another embodiment of the present invention, the switch is in series with the inductance and the output capacitor between its two input terminals.

According to another embodiment of the present invention, a free wheel diode is connected between the midpoint of the inductive element and the negative output terminal.

According to another embodiment of the present invention, the switch is in series with one of the two windings of the inductive element between two input terminals.

According to another embodiment of the present invention, the midpoint of the inductive element is connected to the positive terminal of the output capacitor.

The foregoing objects, features and advantages of the present invention will be discussed in detail in the following non-limiting description of specific embodiments in connection with the accompanying drawings.

DETAILED DESCRIPTION

Figure 1:
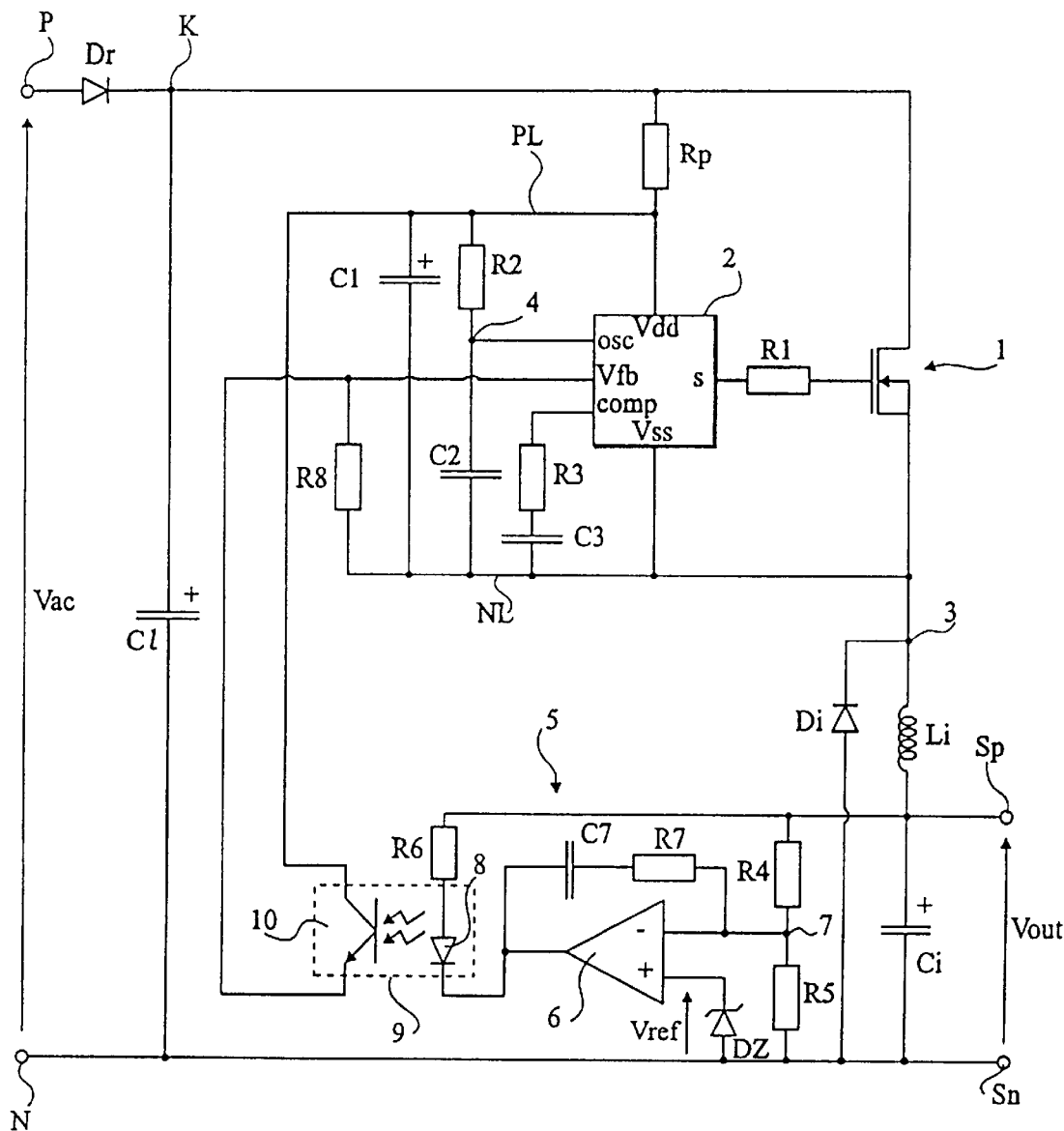
FIGS. 1 to 3, previously described, are meant to show the state of the art and the problem to solve.

The same elements have been designated with the same references in the different drawings. For clarity, only those elements which are necessary to the understanding of the present invention have been shown in the drawings and will be described hereafter. In particular, the details constitutive of the integrated circuit likely to be used by the present invention have not been indicated.

A feature of the present invention is to provide a means for sampling, from the energy of the capacitive element, the supply required by the control block of the switch. Thus, according to the present invention, the control block of the switch is no longer supplied by the input voltage. The use of a resistor (Rp, FIGS. 1 to 3) having to withstand a high voltage and thus causing a strong dissipation is thus avoided.

Figure 4:
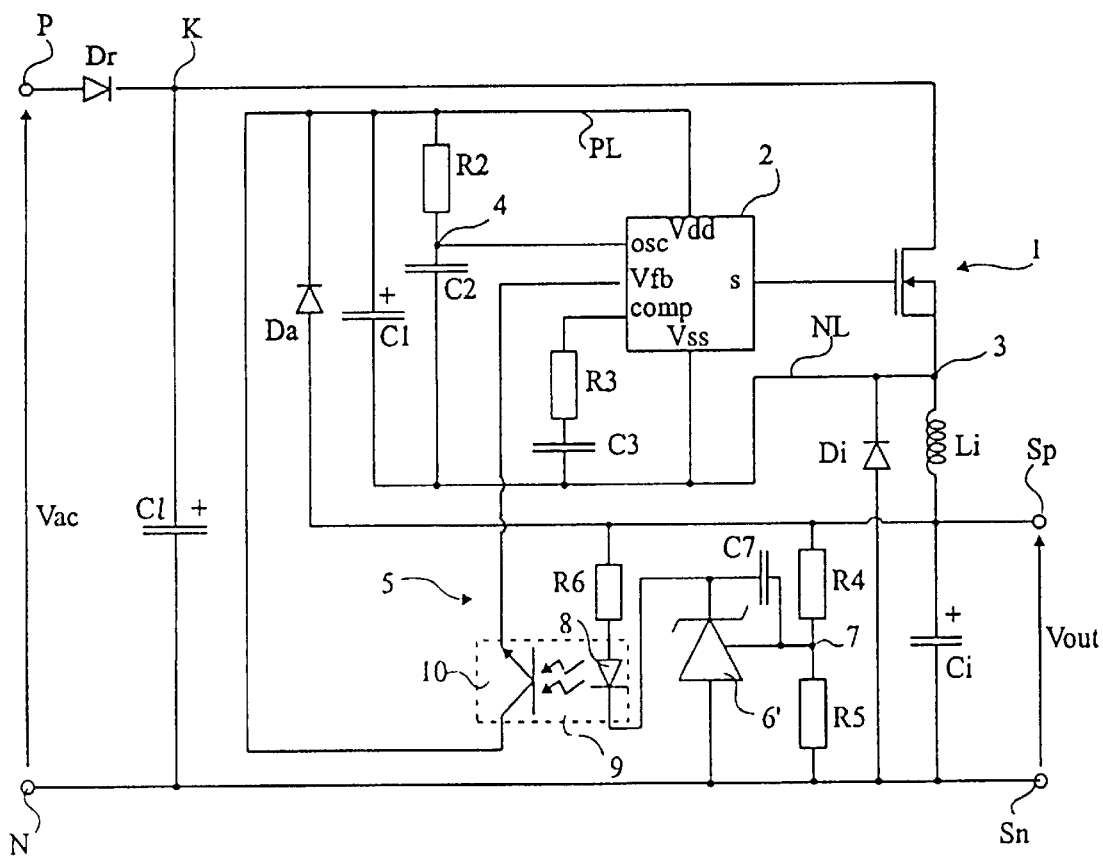
FIG. 4 shows a first embodiment of a non-isolated step-down converter according to the present invention.

This first feature of the present invention is illustrated by FIG. 4 which shows a first embodiment of a non-isolated step-down converter according to the present invention. The circuit of FIG. 4 is to be compared with the prior art circuit shown in FIG. 1. It is supplied by a rectified voltage Vr sampled from cathode K of a rectifying diode Dr, the anode of which is connected, for example, to phase P of an A.C. voltage Vac, for example, the mains. As previously, a capacitor C I is connected between terminal K and neutral N of the A.C. power supply.

The embodiment of FIG. 4 relates to a step-down converter, that is, a switch 1 is connected in series with an inductance Li and a capacitor Ci between terminals K and N, output voltage Vout being sampled across terminals Sp, Sn of capacitor Ci. A free wheel diode Di is connected between terminal Sn and midpoint 3 of the series association of switch 1 with inductance Li. Switch 1 is controlled by a pulse-width modulation block 2, for example, a UCC3824 circuit, an output terminal s of which is connected to the gate of switch 1. In the example of FIG. 4, the ouput resistor (R1, FIG. 1) of block 2 has not been shown. Its presence depends on the internal structure of the integrated circuit forming block 2.

As previously, midpoint 3 defines a reference line NL for the control circuit of switch 1. Thus, a terminal Vss of block 2, intended for being connected to a local reference potential, is connected to line NL. Similarly, a compensation terminal COMP is connected, via a series association of a resistor R3 with a capacitor C3, to line NL. The oscillation frequency of block 2 is determined by a resistor R2 in series with a capacitor C2 between a positive supply line PL of the control circuit and line NL, midpoint 4 of this series association being connected to a terminal OSC of block 2. A terminal for receiving a positive supply Vdd is connected to line PL. Finally, a capacitor C1 connects lines PL and NL to stabilize the supply voltage (Vdd–Vss) of circuit 2.

According to the present invention, line PL is connected, via a diode Da, to output terminal Sp of the switch-mode power supply, the anode of diode Da being connected to terminal Sp and its cathode being connected to line PL. Thus, according to the present invention, there is no link between the control circuit of switch 1 and input terminal K of the assembly which generally forms a high voltage bus. According to the present invention, part of the charge current of output capacitor Ci is sampled to charge capacitor C1 and thus to supply the control circuit of switch 1. For this purpose, advantage is taken from the fact that, when the current flows through free wheel diode Di, voltage Vout is present across inductance Li (neglecting the voltage drop in diode Di).

The condition to be fulfilled for the local supply of block 2 to be able to be provided by output voltage Vout is that diode Da is on during free wheel periods, that is, when switch 1 is off. For this condition to be fulfilled, voltage VC1 across capacitor C1 (that is, the supply voltage Vdd–Vss desired for the control circuit), plus the voltage drop VDa in forward-biased diode Da, has to be smaller than the voltage across inductance Li. Now, the voltage across inductance Li is, during free wheel periods, equal to the voltage across capacitor Ci (that is, output voltage Vout) plus the forward voltage drop VDi in diode Di. Accordingly, the condition to be fulfilled is:

VC1 ≦ Vout+VDi–VDa.

As a first approximation, it can be assumed that voltage VDi is approximately equal to voltage VDa. Accordingly, for circuit 2 to be supplied from the output voltage, voltage Vdd–Vss required for its supply has to be smaller than output voltage Vout. In practice, the current through diode Di, that is, the current required to supply the control block of switch 1, is much smaller than the current used for the load supply and which flows through diode Di. Accordingly, the forward voltage drops in diodes Di and Da are not strictly equal. It can be assumed that there is a slight difference on the order of one hundred millivolts.

It should be noted that the supply of control circuit 2 holds the priority with respect to the load supply, so that the assembly provided by the present invention is particularly reliable. Indeed, when voltage VC1 is smaller than output voltage Vout, free wheel diode Di blocks. Accordingly, all the inductance current is then used to charge capacitor C1, and thus to supply block 2. Accordingly, capacitor C1 is always supplied, so that the voltage thereacross is always equal to the output voltage. In the case where the output voltage is lowered by a decrease of the set-point order, the voltage across capacitor C1 also decreases, which results in increasing the on-state time of switch 1.

Figure 2:
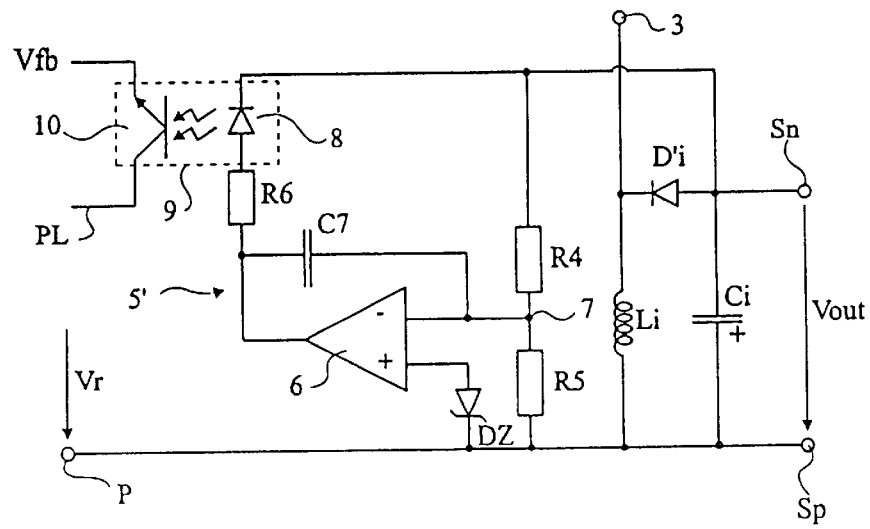

In the first embodiment illustrated by FIG. 4, the control of output voltage Vout is performed by a conventional control circuit 5, for example, of the type of that shown in FIG. 1. Thus, an input control terminal Vfb of circuit 2 is connected to the emitter of a phototransistor 10 of an optocoupler 9, the collector of this phototransistor being connected to positive supply line PL of block 2. Photodiode 8 of optocoupler 9 is connected, by its anode and via a resistor R6, to terminal SP. Its cathode is connected to the output of an error amplifier 6, for example, a circuit known under trade name TL431. In FIG. 4, the operational amplifier shown in FIG. 1, associated with its voltage reference (DZ), has been shown by a single element referenced as 6'. An error input of amplifier 6' is connected to midpoint 7 of a series association of a resistor R4 with a resistor R5 between terminals Sp and Sn, a capacitor C7 being connected between the output of error amplifier 6' and node 7. The operation of the control circuit shown in FIG. 4 is identical to the operation of the conventional circuit described in relation with FIG. 1.

An advantage of the present invention is that it suppresses any power dissipation for the supply of the control circuit of switch 1 while avoiding any connection of this control circuit to the high voltage bus via a resistive element.

It should be noted that, in the embodiment illustrated in FIG. 4, the minimum output voltage Vout substantially corresponds to the minimum supply voltage required for control circuit 2 of switch 1.

Figure 5:
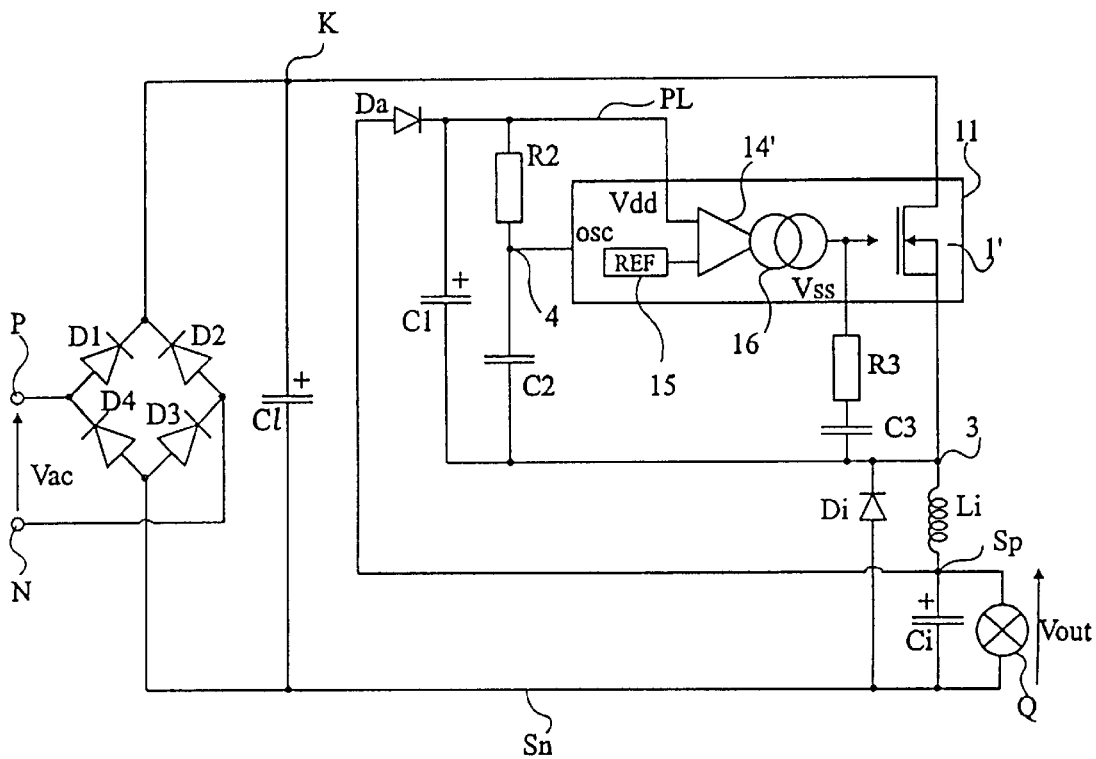
FIG. 5 shows a second embodiment of a non-isolated step-down converter according to the present invention.

FIG. 5 shows a second embodiment of a step-down converter according to the present invention. This embodiment is meant to illustrate a second feature of the present invention, which enables avoiding the use of an isolating component to control the converter output voltage.

In the embodiment of FIG. 5, a double halfwave rectification of an A.C. voltage Vac by means of a diode bridge D1, D2, D3, D4, two rectified output terminals of which define positive and reference terminals K and Sn of the converter, has been assumed. As previously, a capacitor C1 is connected between terminals K and Sn. It should be noted that, in all embodiments of the present invention, a single or double halfwave can be used without modifying the features of the present invention.

The embodiment illustrated in FIG. 5 provides the use of an integrated circuit 11 gathering a high voltage switch 1', formed of an N-channel MOS transistor, and its control circuit. Such a circuit, known under trade name VIPER, is available in several versions according to the load power (for example, 10, 20, 50 Watts).

The embodiment of FIG. 5 relates to a step-down converter in which inductance Li and capacitor Ci are connected in series between node 3 and terminals Sn. In FIG. 5, a lamp Q has been shown to symbolize the load receiving voltage Vout.

As in the first embodiment, a diode Da is used to supply a capacitor C1, the terminals PL and NL of which define local supply lines of circuit 11.

Midpoint 4 of a series association of a resistor R2 with a capacitor C2 is connected to an input terminal OSC of circuit 11 determining the oscillation frequency (for example, on the order of 20 kHz) of the switching of voltage Vr.

Figure 3:
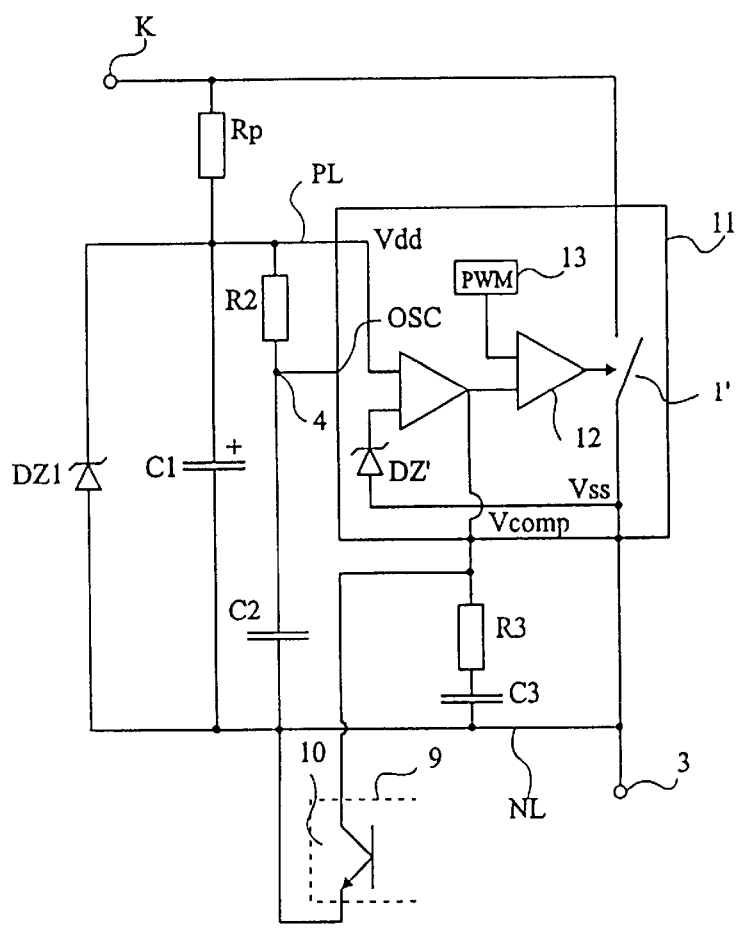

In FIG. 5, VIPER circuit 11 has been schematically shown in a way different from the representation of FIG. 3. This is a second current simplified representation of such an integrated circuit. This representation shows an error amplifier 14', a reference input of which receives a reference voltage (REF) from a block 15 and a measurement input of which is connected to supply terminal Vdd of circuit 11. Terminal Vdd is connected to positive local supply line PL. Error amplifier 14' is connected, via a current source 16, to a compensation terminal Vcomp of circuit 11 and gives an image of the turn-on time of MOS transistor 1'. Terminal Vcomp is, as previously, connected via a series association of a resistor R3 with a capacitor C3 forming a compensation circuit to negative local supply line NL connected to terminal Vss of circuit 11.

The embodiment of FIG. 5 uses the first feature of the present invention, which is to connect a local supply diode Da of circuit 11 to positive terminal Sp of output capacitor Ci, to supply circuit 11 with a minimum dissipation.

However, a feature of the present invention is that diode Da here is also used to measure output voltage Vout to perform the control by means of circuit 11. Indeed, a variation of voltage Vout will result in a variation of the voltage across capacitor C1 which will thus modify the width of the control pulses of switch 1'.

As indicated previously, a VIPER component 11 such as used by the present invention is a component which is intended for regulating a 13-volt voltage. Accordingly, the embodiment illustrated in FIG. 5 applies to the case where output voltage Vout is on the order of 13 volts (minus the difference between the voltage drops in forward-biased diodes Di and Da).

An advantage of the present invention is that by providing direct supply of VIPER circuit 11 from output voltage Vout, it is now possible to avoid using an isolation transformer to perform the control of the output voltage.

Another advantage of the present invention is that it avoids using an additional error amplifier and thus enables using the error amplifier integrated to the control block of switch 1'.

It should be noted that, if the present invention requires using a diode Da for the local supply of the VIPER circuit, the zener diode (DZ1, FIG. 3) conventionally provided to limit the voltage across capacitor C1 is no longer necessary.

Figure 6:
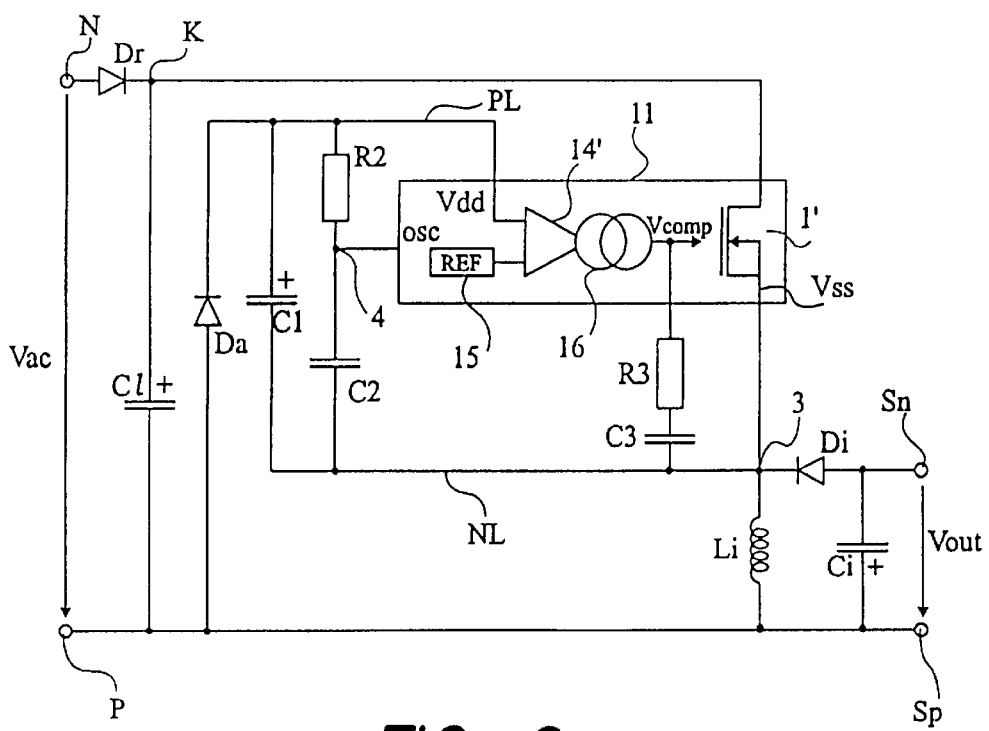
FIG. 6 shows a first embodiment of a non-isolated step-down/step-up converter according to the present invention.

FIG. 6 shows an embodiment of a step-down/step-up voltage converter according to the present invention. This embodiment is intended for describing the present invention in relation with a converter in which capacitor Ci is not in series with inductance Li and the switch between terminals K and P of application of rectified voltage Vr. Thus, this embodiment is to be compared with the conventional embodiment illustrated by FIG. 2.

The positive terminal of capacitor Ci defines positive terminal Sp providing output voltage Vout and here corresponds to phase P of A.C. supply Vac. By convention, the direction of the arrows symbolizing A.C. voltage Vac in the different drawings indicates the most positive terminal.

The second terminal of capacitor Ci, defining reference node Sn of output voltage Vout, is connected to the anode of free wheel diode Di, the cathode of which is connected to midpoint 3 of the series association of switch 1' with inductance Li between terminals K and P. The rectified voltage present across capacitor C1 is provided, as previously, by a rectifying diode Dr.

The embodiment of FIG. 6 uses the feature of the present invention which is to sample the local supply of the control circuit of switch 1' (herein, integrated in a VIPER circuit 11), from the energy of inductance Li, here from output voltage Vout. Thus, a diode Da connects terminal Sp to a line PL defining a positive local supply potential of circuit 11. Reference line NL corresponds, as previously, to midpoint 3.

The other components of the assembly of FIG. 6 (capacitors C1, C2, C3, and resistor R2 and R3) are mounted identically to the previous embodiments of the present invention.

It should be noted that, like for a step-down converter such as shown in FIGS. 4 and 5, the voltage across inductance Li is, during free wheel periods, equal to voltage Vout plus the voltage across forward-biased diode Di. Further, the voltage across capacitor C1 of local supply of the control circuit is equal to the voltage across inductance Li minus the voltage drop of forward-biased diode Da.

Accordingly, the control function illustrated in relation with the preceding drawings also applies to this embodiment.

It should be noted that, such as shown in FIG. 6, the assembly is intended for an output voltage Vout of approximately 13 volts. Indeed, although a step-down/step-up converter is involved, VIPER circuit 11 regulates the current in transistor 1' so that its own supply voltage is 13 volts. Thus, the voltage across capacitor C1 has to correspond to this value. Voltage Vout then substantially corresponds (in FIG. 6) to this voltage.

Figure 7:
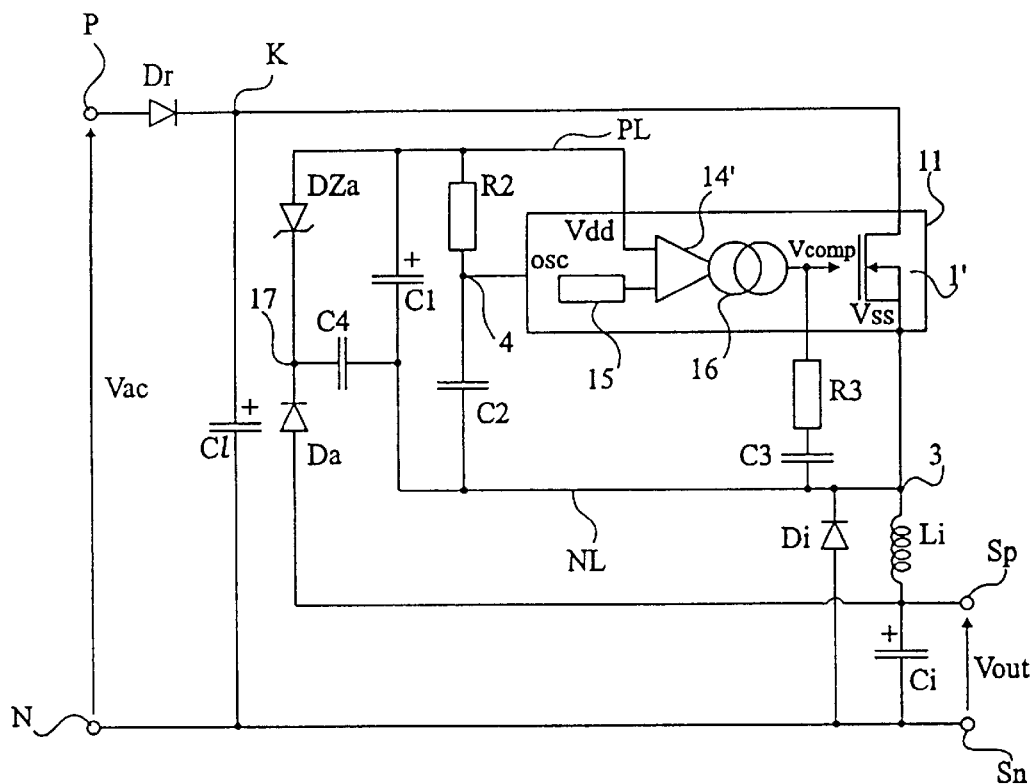
FIG. 7 shows a third embodiment of a non-isolated step-down converter according to the present invention.

FIG. 7 shows a third embodiment of a converter according to the present invention in which output voltage Vout is provided to be greater than the voltage (13 volts) determined by the supply voltage of integrated circuit 11 of control of switch 1'.

A feature of this embodiment is to provide a zener diode DZa in series with diode Da between positive local supply line PL of circuit 11 and positive terminal Sp of output capacitor Ci, the midpoint 17 of this series association interconnecting the respective cathodes of diode Da and of zener diode DZa.

With such a zener diode DZa, the threshold voltage of this zener diode adds to the voltage across capacitor C1 and to the forward voltage of diode Da between terminals Sp and 3. Accordingly, output voltage Vout of the assembly here corresponds to 13 volts (supply voltage necessary for circuit 11), plus the difference between the forward voltage drops in diodes Di and Da (on the order of 0.1 volt), plus the threshold voltage of zener diode DZa which is then chosen accordingly.

Preferably, a capacitor C4 connects node 17 to negative local supply line NL to better stabilize voltage Vout according to possible load variations.

Figure 8:
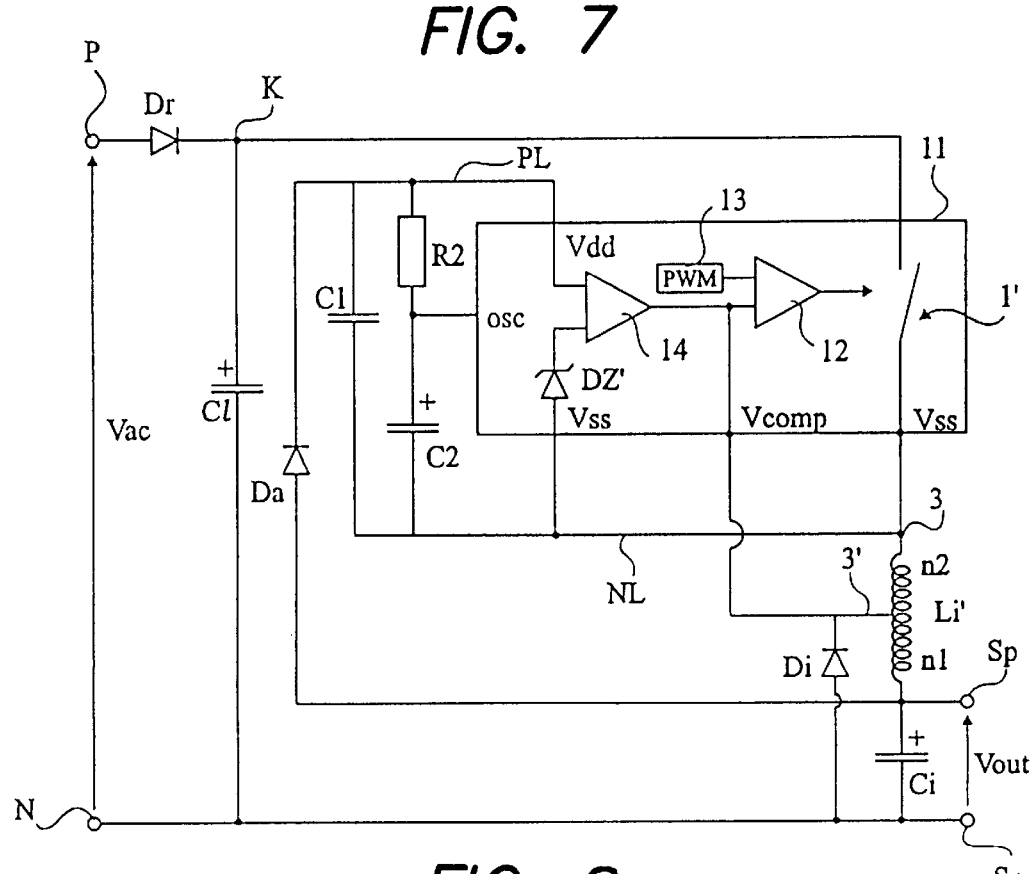
FIG. 8 shows a fourth embodiment of a non-isolated step-down converter according to the present invention.

FIG. 8 shows a fourth preferred embodiment of a step-down converter according to the present invention. This embodiment uses the first feature of the invention, that is, it provides a local supply of circuit 11 from the energy of the inductive element through a diode Da, the anode of which is connected to an extremity of the inductive element.

This embodiment characterizes by the fact that inductance Li' has a tap 3' on which the cathode of free wheel diode Di is connected. Reference line NL of the local supply of circuit 11 is, as previously, connected to midpoint 3 of the series association of switch 1' with inductance Li'.

In the embodiment of FIG. 8, integrated circuit 11, gathering the switch in the form of an N-channel MOS transistor and its control circuit associated with error amplifier 14, uses the symbols used in relation with FIG. 3.

The use of an inductance with a central tap enables output voltage Vout to be smaller than the local supply voltage of circuit 11. The ratio between output voltage Vout and the supply voltage of circuit 11 depends on the ratio between the respective numbers of turns of coil n1 and n2 on either side of tap 3'.

The relation between voltage VC1 across capacitor C1 and voltage Vout across capacitor Ci can be expressed as:

$$VC1(1+n2/n1) (Vout+VDi)-VDa,$$

where VDi and VDa represent the voltage drops in respective forward-biased diodes Di and Da.

The circuit of FIG. 8 has, in addition to all the advantages associated with the preceding embodiments, the additional advantage of enabling generation of a voltage Vout smaller than 13 volts with a VIPER-type circuit.

It should be noted that this embodiment can also be implemented in the case of a step-down/step-up converter of the type illustrated in FIG. 6. Then, one has the advantage of having an output voltage lower than the local supply voltage of the control circuit. Taking the diagram of FIG. 6 as a basis, the tap of the inductance is connected to positive terminal Sp of capacitor Ci and the connection of this positive terminal with the midpoint of the series association of the inductance with diode Da is suppressed.

Figure 9:
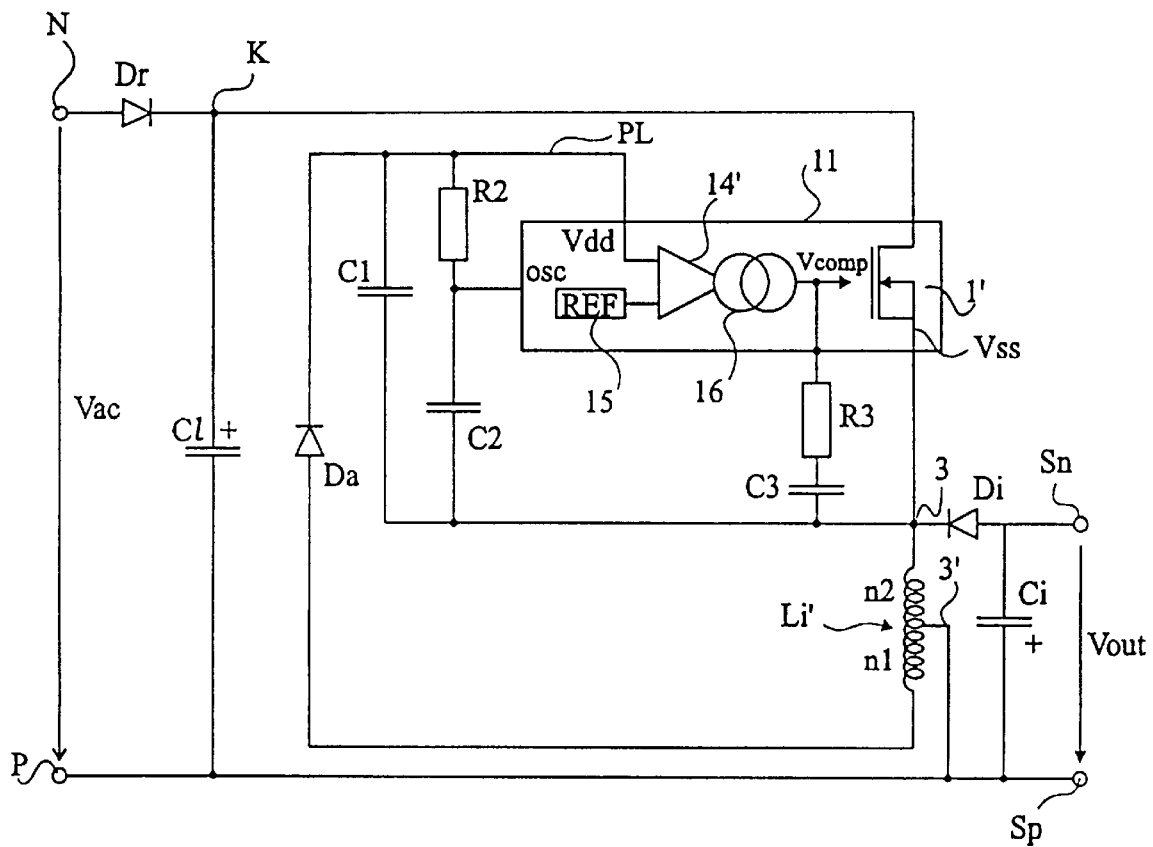
FIG. 9 shows a second embodiment of a non-isolated step-down/step-up converter according to the present invention.

FIG. 9 shows such an embodiment of a step-down/step-up converter with a tapped inductance. The node 3' corresponds to terminal Sp and is connected to the phase P of the voltage Vac. The inductance Li' is connected between the node 3 and the anode of diode Da. The respective operations of the embodiments of FIGS. 8 and 9 can be deduced from the disclosure of the former figures, taking into account the specific feature of the tapped inductance.

Of course, the present invention is likely to have various alterations, modifications, and improvements which will readily occur to those skilled in the art. In particular, the respective sizings of the different components used will be determined according to the application and, especially, according to the desired output voltage and to the load power. Additionally, it will be noted that a tapped inductance can also be associated with an isolating component for servo-controlling the output voltage, that is, in connection with a converter of the type shown in FIG. 4.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A non-isolated voltage converter, of switch-mode type, including a capacitor between terminals that provide an output voltage regulated by a circuit that controls a switch that provides current to an inductive element, the converter comprising means for locally supplying the control circuit from the energy of the inductive element, the inductive element having a tap between two windings, and the output voltage being smaller than the local supply voltage of the control circuit.

2. The converter of claim 1, wherein said means is formed of a diode interposed between an extreme terminal of the inductive element and a positive terminal of a capacitor of local supply of the control circuit, the negative terminal of the local supply capacitor being connected to the midpoint of the series association of the switch with the inductive element.

3. The converter of claim 1, further comprising an integrated circuit that includes the control circuit and the switch.

4. The converter of claim 1, wherein said means locally supplies the control circuit from the output voltage.

5. The converter of claim 4, wherein the switch is in series with the inductance and the output capacitor between its two input terminals.

6. The converter of claim 4, wherein a free wheel diode is connected between the tap of the inductive element and the negative output terminal.

7. The converter of claim 1, wherein the switch is in series with one of the two windings of the inductance between two input terminals.

8. The converter of claim 7, wherein the tap of the inductive element is connected to the positive terminal of the output capacitor.

9. A non-isolated voltage converter, of switch-mode type, including a capacitor between terminals that provide an output voltage regulated by a circuit that controls a switch that provides current to an inductive element, the converter comprising means for locally supplying the control circuit from the energy of the inductive element, said means being formed of a diode interposed between a positive terminal of the output capacitor and a positive terminal of a capacitor of local supply of the control circuit, the negative terminal of the local supply capacitor being connected to a midpoint of a series association of the switch with the inductive element, and a zener diode being interposed, in series with the local supply capacitor and the local supply diode, between said midpoint and the positive output terminal.

10. The converter of claim 9, wherein the zener diode is interposed between the positive terminal of the local supply capacitor and the cathode of the local supply diode.

11. The converter of claim 9, further comprising an integrated circuit that includes the control circuit and the switch.

12. The converter of claim 9, wherein the switch is in series with the inductance and the output capacitor between its two input terminals.

13. The converter of claim 9, wherein the switch is in series with the inductance between two input terminals.

* * * * *